UNITED STATES PATENT OFFICE.

CHARLES BRUEDER, OF ARCHES, FRANCE.

PROCESS OF MAKING ADHESIVES.

SPECIFICATION forming part of Letters Patent No. 646,724, dated April 3, 1900.

Application filed January 27, 1899. Serial No. 703,578. (No specimens.)

*To all whom it may concern:*

Be it known that I, CHARLES BRUEDER, a citizen of the Empire of Germany, residing at Arches, Vosges, in the Republic of France, have invented certain new and useful Improvements in Processes of Treating Amylaceous Substances, of which the following is a specification.

Alkaline chlorites and hypochlorites in an alkaline medium under special conditions transform common feculæ and starches into a gelatinous product.

My invention consists in the treatment of such feculæ or other amylaceous matters by means of alkaline chlorites or hypochlorites or the like for the purpose of obtaining a gummy and gelatinous product possessing all the properties of and being suitable for the same industrial purposes as animal gelatin.

In carrying my invention into practice, for example, one thousand kilos of feculæ are dissolved in eight hundred to nine hundred liters of water containing one thousand liters of a chlorite or hypochlorite—such as, for instance, the ordinary liquid potassium hypochlorite. This solution is allowed to stand. The reaction takes from one and a half to two hours. In order, however, to allow the product to thoroughly settle, the solution should be permitted to stand for about twelve hours thereafter. It is then decanted and the residue allowed to dry. The latter is then heated at a temperature of from 50° to 100° centigrade until entirely dry. The resultant product is of a very excellent white color and is soluble in water-like gelatin. It possesses all the industrial properties of the latter. Ordinary sodium hypochlorite may be used in place of the potassium hypochlorite. The chemical reaction which takes place under these circumstances is absolutely novel. The starches employed usually contain sulfurous acid. Before subjecting the substances, therefore, to the action of the hypochlorite this sulfurous acid is neutralized and transformed by treatment with sodium peroxid into neutral sodium sulfate. The sulfurous acid if allowed to remain in the amylaceous matters to be treated would decompose the hypochlorite and liberate chlorin, and the product obtained under these conditions not only would have none of the properties of gelatin, but it would, moreover, contain free chlorin. On the other hand, by operating in an alkaline medium the product after having been dried presents a weak alkaline reaction without any trace of free chlorin. The product made in this manner after heating with water for use contains only calcium or potassium chlorid. For starching dyed materials of delicate shades it will suffice to neutralize the solution by traces of acetic acid.

It should be understood that too great a degree of alkalinity prevents or retards the transformation of the amylaceous matter by the chlorite or hypochlorite.

A characteristic of the product obtained by this process of treatment is to give, when it is heated in the proportion of twenty to fifty per cent. of the weight of water used, glue-like substances which thicken for a few moments, then become fluid, and contain no traces of free chlorin, but simply of sodium or potassium chlorid.

I reserve to myself the right of altering the proportions and the temperatures above set forth according to the products to be obtained.

Having thus described my invention, I claim as new and desire to secure by Letters Patent—

1. The herein-described process of treating amylaceous substances, which consists in subjecting feculæ or other amylaceous substances to the action of an alkaline chlorite or hypochlorite, substantially as set forth.

2. The herein-described process of treating amylaceous substances, which consists in neutralizing the acid properties of the same, and subjecting the so-neutralized substances to the action of an alkaline chlorite or hypochlorite, substantially as set forth.

3. A new or improved process for the manufacture of an adhesive material extracted from starch, and utilizable in the same manner as common glue, this process consisting in treating starch with a solution of chlorite or hypochlorite of potash or of soda, after which the mass is allowed to stand, and subsequently decanting and drying the same, substantially as set forth.

In testimony that I claim the foregoing as my invention I have signed my name in presence of two subscribing witnesses.

CH. BRUEDER.

Witnesses:
HUGUENOT LOUIS,
PIERRE GYARYON.